Aug. 25, 1931.  K. B. KILBORN  1,820,073
COOLING MEANS FOR ROLLER MILLS
Filed Oct. 18, 1928
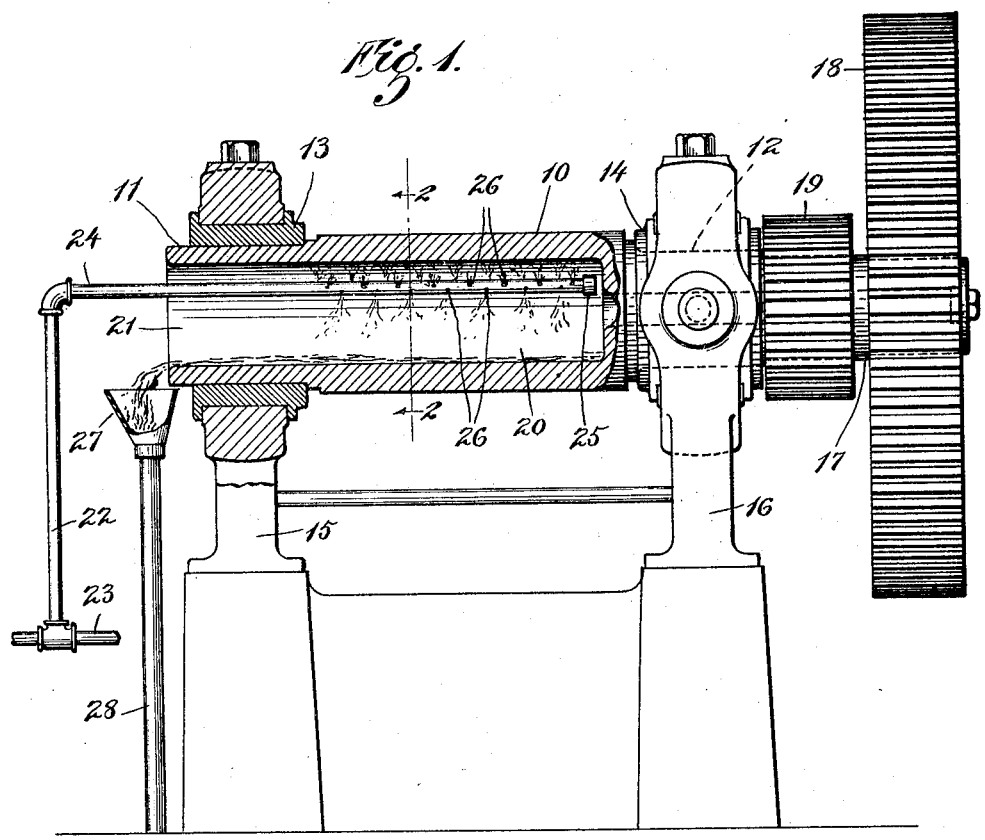
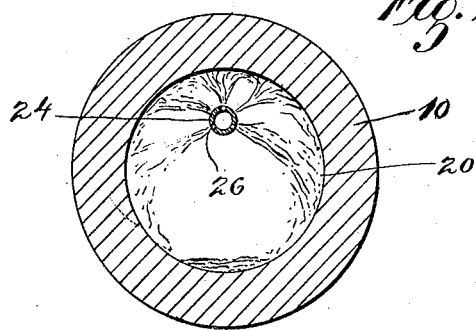
Inventor
K. B. Kilborn
By Robert M. Pierson, Atty.

Patented Aug. 25, 1931

1,820,073

UNITED STATES PATENT OFFICE

KARL B. KILBORN, OF FAIRLAWN, OHIO, ASSIGNOR TO SEIBERLING RUBBER COMPANY, OF BARBERTON, OHIO, A CORPORATION OF DELAWARE

COOLING MEANS FOR ROLLER MILLS

Application filed October 13, 1928. Serial No. 313,239.

This invention relates to means for cooling the rolls of mills, such as those for working rubber and other materials, by the application of water to the interior thereof. My objects are to permit a reduction in the quantity of water employed for a given cooling effect, to minimize or avoid the necessity for artificial refrigeration to pre-cool the water, to allow the use of water at a higher initial temperature than has heretofore been required and to facilitate the cleaning of scale from the interior of the rolls.

Of the accompanying drawings,

Fig. 1 is a side elevation, partly in section, showing a rubber mill having a roll provided with my improved cooling means.

Fig. 2 is a cross-section on the line 2—2 of Fig. 1.

In rubber mixing and refining mills calenders etc., the working of the rubber is accompanied with considerable evolution of excess heat which has to be carried off by cooling the roll walls in order to avoid the development of undesirably high temperatures in the stock. For this purpose the rolls are cast hollow, a water supply pipe is led into the interior through a stuffing-box coaxial with the roll, and the heated water is discharged either through the same end of the roll or through the opposite end.

Heretofore, the opening provided in the roll trunnion for the escape of the water has been much smaller in diameter than the interior chamber so that, with a gravity discharge, said chamber would be nearly or quite half full, and with a pressure circulation it could be completely full. In such an arrangement the cooling effect is produced largely or wholly by the conduction of sensible heat to the water, whereas in my present improvements I utilize also the latent heat of evaporation of a film of water covering practically the entire inner surface of the roll walls.

In the drawings, 10 is one of a pair of rubber-mill rolls, said roll having journals 11, 12 mounted in bearings 13, 14 on frame standards 15, 16; the roll being extended at one end in a shaft or trunnion 17 to which is affixed a large driven gear 18 and a smaller gear 19 adapted to mate with a similar one on the shaft of the companion roll.

Roll 10 is cast hollow, with an internal cooling chamber 20 of relatively large diameter as compared with the thickness of the roll walls in order to provide for rapid transmission of heat inwardly through said walls. According to my invention, the journal 11 is made large enough to permit the mouth or water-discharge end 21 of said chamber to be substantially as large in diameter as the rest of the chamber in order to avoid the accumulation of a pool of water of any substantial depth upon the floor of said chamber, this outlet being here shown of the same diameter as the body of said chamber.

An L-shaped pipe 22, which branches from and is supported by a fixed supply pipe 23, is provided with a horizontal member 24 extending longitudinally into the roll-chamber 20 and capped at 25 at its inner end. Member 24 is formed with a large number of small spray apertures 26 distributed longitudinally and circumferentially thereof for discharging jets of water at high velocity against the interior surface of the roll wall.

I prefer to locate the spraying pipe or member 24 above the axis of the roll, adjacent the roof of the chamber 20, and to so arrange its spraying apertures that the greater proportion of the total number of jets will impinge on the upper half of the roll wall. The water forms a sheet or film which descends by gravity down the sides of the chamber, and any excess thereof flows out along the floor of the chamber in a shallow stream which is discharged through the mouth 21 and may be received in a funnel 27 supported on a vertical drain pipe 28 below said mouth.

By thus avoiding the accumulation of any substantial pool of water in the chamber 20 and subjecting the walls of said chamber to only a film or spray bath of water, substantially the entire surface of said walls is available for cooling by evaporation as well as by transfer of sensible heat from the metal walls to the water. The impingement of a majority of the water jets against the upper half of the chamber walls increases the time allowed for heat transfer and evaporation as compared with an equal distribution or a predominating jet supply to the lower half.

I am thereby enabled to attain the desired cooling effect with less water than has heretofore been required. I can also use water at a higher initial temperature and so dispense with precooling by artificial refrigeration with its attendant expense. The large open end of the interior chamber provides a roll form which is simple to cast and also allows for the insertion of scraping tools for cleaning off scale which may be deposited from the waters employed, and which, if allowed to accumulate, would have the effect of reducing the heat-transmitting capacity of the walls.

My invention may be applied to various kinds of rubber mills and calenders as well as to other mills whose rolls require cooling. The described particulars of construction and arrangement are subject to modification in such matters as locating the large gear 18 at either end of the first driven roll, supporting the pipe 24 from either end of the roll and extending its spraying apertures to cool the journals, and slightly varying the relative diameter of the discharge opening 21, as will be obvious, and the invention may be improved upon, all without departing from the scope thereof as defined in the appended claims.

I claim:

1. In a roller mill, the combination of a horizontal roll formed with a chamber having an outlet at one end substantially as large in diameter as the body of the chamber, and means for projecting water jets against the walls of said chamber in greater quantity in the upper half than in the lower half thereof.

2. The method of internally cooling a heated mill roller which comprises spraying water in restricted quantity to form a thin film over substantially the entire inner surface of said roller for cooling the latter by sensibly heating and also largely by evaporating the water film, distributing said film by rotation of the roller, and, without accumulating a substantial pool or heavy stream thereof within the roller, discharging the excess water from said roller.

In witness whereof I have hereunto set my hand this 15th day of October, 1928.

KARL B. KILBORN.